(12) United States Patent        (10) Patent No.:     US 8,605,338 B2
Baxter et al.                    (45) Date of Patent:    Dec. 10, 2013

(54) USER FEEDBACK VIA SEE THROUGH PLATEN OVERLAY

(75) Inventors: Nicholas Baxter, Welwyn Garden (GB); Gareth Dobinson, Welwyn Garden (GB); Alexandria Dobinson, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 193 days.

(21) Appl. No.: 13/159,624

(22) Filed: Jun. 14, 2011

(65) Prior Publication Data

US 2012/0320429 A1    Dec. 20, 2012

(51) Int. Cl.
*H04N 1/04* (2006.01)

(52) U.S. Cl.
USPC .................. 358/474; 358/497; 358/486

(58) Field of Classification Search
USPC .......... 358/474, 486, 497, 496, 442, 403, 501
See application file for complete search history.

(56) References Cited

U.S. PATENT DOCUMENTS

| | | | |
|---|---|---|---|
| 5,124,798 A * | 6/1992 | Tanabe et al. | 358/296 |
| 5,907,160 A | 5/1999 | Wilson et al. | |
| 6,392,250 B1 | 5/2002 | Aziz et al. | |
| 7,011,420 B2 | 3/2006 | Cok | |
| 7,523,389 B2 * | 4/2009 | Hirata | 715/205 |
| 7,561,841 B2 * | 7/2009 | Callis et al. | 399/327 |
| 7,630,105 B2 | 12/2009 | Sheng et al. | |
| 7,755,808 B2 * | 7/2010 | Kelly et al. | 358/474 |
| 8,085,162 B2 * | 12/2011 | Takahashi | 340/687 |

OTHER PUBLICATIONS

"The Invisible OLED Laptop to End All Laptops"; 3 pages, internet paper, site http://gizmodo.com/@!15442217/the-invisible-oled-laptop-to-end-all-laptops; Apr. 8, 2011.

* cited by examiner

*Primary Examiner* — Negussie Worku
(74) *Attorney, Agent, or Firm* — Fay Sharpe LLP

(57) ABSTRACT

A printing system and apparatus assembly that incorporates a transparent platen for supporting and scanning a first image therethrough. The transparent platen includes a translucent display layer having an array of light devices that comprise organic light emitting diodes. A user interface of the system is coupled to the transparent platen with a processor. Based on input and/or data provided at the user interface, an image is displayed through the platen with the display layer.

20 Claims, 5 Drawing Sheets

USER FEEDBACK VIA SEE THROUGH PLATEN OVERLAY

BACKGROUND

This disclosure relates generally to ionographic or electrophotographic imaging and printing apparatuses or reproduction machines, and more particularly is directed to providing a user feedback at a transparent platen used for scanning images.

In xerography (e.g., electrophotography, electrostatographic printing, or photocopying), a uniform electrostatic charge is placed upon a photoreceptor surface. The charged surface is then exposed to a light image of an original object to selectively dissipate the charge to form a latent electrostatic image of the original. The image is developed by depositing finely divided and charged particles (e.g., toner) upon the photoreceptor surface. The charged particulate is electrostatically attracted to the electrostatic image to create a visible replica of the original. The developed image is then transferred from the photoreceptor surface to a final substrate (e.g., paper). The particulate image is then fixed ("fused") to the substrate to form a permanent replica ("photocopy") of the original object.

In office copiers and scanners, a platen is a flat glass surface on which operators place papers or books for scanning, which is also referred to as the flatbed. Platens are also used in some printers, such as the dot-matrix printer and other image print systems. Image forming systems can vary in their features depending upon country of manufacture, model and specifications. For example, in most printing systems, the alignment markers are adjacent to a glass platen, upon which materials (e.g., documents, forms, books, or other items) to be scanned are supported. In the United States, for example, the alignment markers generally are provided at the right side of a glass platen and the scanning area for scanning or printing a copy is at a top right hand corner of the platen. However, in other geographical regions, a scanning area, in which the scanning material/items are placed, is in the center of the platen, or top-left. Depending upon the size of the paper selected for printing a scanned image on, the area in which the scanning material is aligned on the platen varies.

The variations in printers and alignment areas can sometimes be overlooked. Thus, a need arises to communicate more effectively to a user of printing systems in particular without impeding the image quality or copying process, while enhancing the copying process.

INCORPORATION BY REFERENCE

The following references, the disclosures of which are incorporated in their entireties by reference herein, are mentioned:

U.S. Pat. No. 5,907,160, issued May 25, 1999, entitled "THIN FILM ORGANIC LIGHT EMITTING DIODE WITH EDGE EMITTER WAVEGUIDE," by James M. Wilson and Jean-Michael Guerin.

U.S. Pat. No. 6,392,250, issued May 21, 2002, entitled "ORGANIC LIGHT EMITTING DEVICES HAVING IMPROVED PERFORMANCE," by Hany M. Aziz, Zoran D. Popovic, and Nan-Xing Hu.

BRIEF DESCRIPTION

The following presents a simplified summary in order to provide a basic understanding of one or more aspects of the disclosure. This summary is not an extensive overview and is neither intended to identify key or critical elements, nor to delineate the scope thereof. Rather, the primary purpose of the summary is to present some concepts of the disclosure in a simplified form as a prelude to the more detailed description that is presented later.

An imaging system and a scanning assembly are disclosed that include a transparent platen, a scanning module, and a user interface. The transparent platen comprises a display layer having light emitting devices therein. The display layer extends over at least one side of the transparent platen. In certain embodiments, the display layer extends laterally along a side of the transparent platen entirely. An opposing side and/or the side of the platen having the display later supports scanning materials/items to scan an image to be printed or sent over a network.

In one embodiment, the scanning module scans a first image of an item supported on a transparent platen while a display layer of the platen provides optical information, such as a second optical image that is incorporated into the first image during scanning. In other embodiments, a second optical image is displayed through the transparent platen before and/or after an item is scanned in order to not interfere with the scanned image of the item.

In another embodiment, an image forming system comprises a photoreceptor, a charging device that generates electrical charge to the photoreceptor, an exposure station that patterns an exposure on the photoreceptor, and a development station that develops toner onto the photoreceptor. The system further comprises a transfer station at a transfer location proximate to the photoreceptor that is configured to transfer toner from the photoreceptor to a continuous print web medium with a transfer current, a scanning module for scanning scan items, and a transparent platen that supports the items placed thereon for scanning by the scanning module. The transparent platen includes a display layer that is at least partially translucent and displays an image to a user through the platen. A user interface display is coupled to the display layer and receives user input. The user interface and the display layer each display error messages through the transparent platen when an error occurs in the system. In certain other embodiments, the display layer includes organic light emitting diodes to display optical data to the user, such as the error message displayed on the user interface display or other information for providing feedback to the user.

The following description and annexed drawings set forth in detail certain illustrative aspects and implementations of this disclosure. These are indicative of only a few of the various ways in which the principles and embodiments discussed herein may be employed.

DETAILED DESCRIPTION

Figure 1:
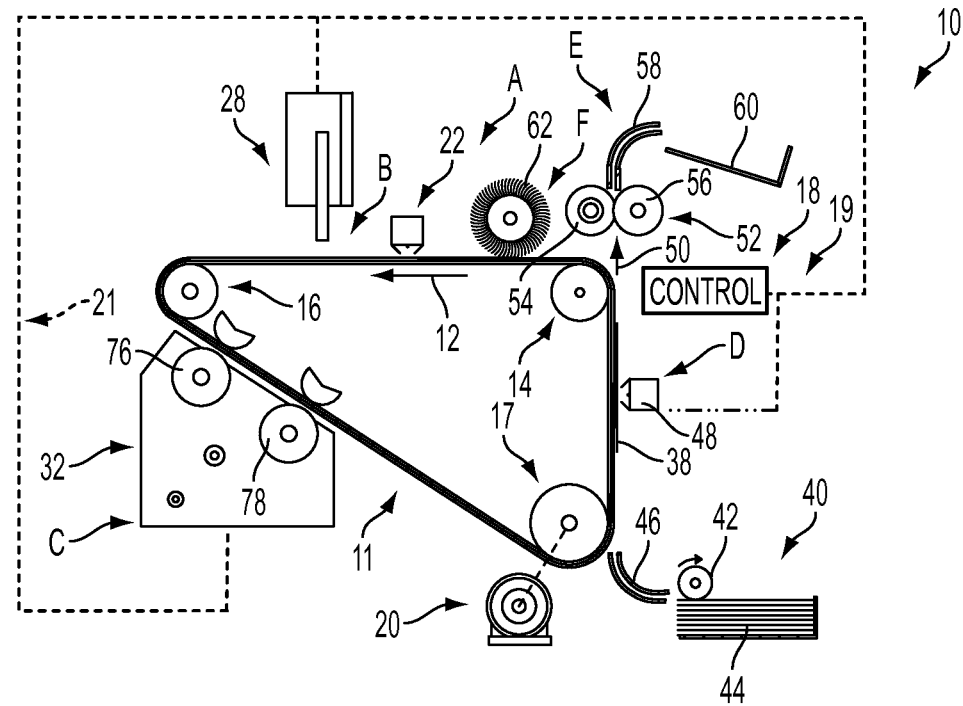
FIG. 1 is a schematic representation of an exemplary aspect of a print system.
Figure 1:
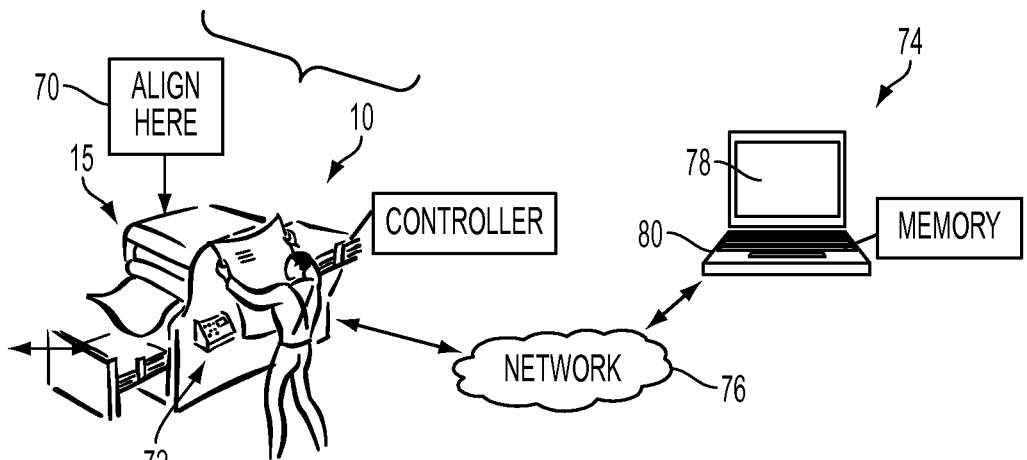

One or more implementations of the present disclosure will now be described with reference to the attached drawings, wherein like reference numerals are used to refer to like elements throughout. An imaging system and apparatus are disclosed that provides optical data for feedback to the user through light emitting devices in a display layer of a transparent platen. The display layer extends alongside at least one side of the platen. The transparent platen also supports scan material on the surface of at least one side with the display layer or on an opposing adjacent side extending therealong. For example, before, during and/or after an item is placed on the transparent platen to be scanned, the display layer provides optical information (e.g., a message, a direction, instruction, an image, a colored in area or other data) to a user scanning the item. Afterwards, the item may be printed, saved, transmitted over a network, or edited via a user interface.

FIG. 1 schematically depicts the various components of an illustrative electrophotographic printing/imaging system 10 having a transparent platen 15. The printing machine 10 shown in FIG. 1 employs various imaging components shown in the top portion. Some of the processing stations employed in the FIG. 1 printing system 10 are well known to one of ordinary skill in the art, and thus, are discussed herein briefly for purposes of exemplifying various embodiments of this disclosure. For example, the system 10 has a photoconductor 11, such as a photoconductive belt or any other suitable type of photoreceptor for transferring latent images to a media. The photoconductive belt 11 illustrated, for example, moves in the direction of arrow 12 to advance successive portions of the photoconductive surface of the belt through the various stations. As shown, photoreceptor 11 is entrained about rollers 14 and 16, which are mounted to be freely rotatable, and drive roller 17, which is rotated by a motor 20 to advance the belt in the direction of the arrow 12.

A controller 18 receives signals from various sensors in a feedback loop 21 at a feedback input 19 and is configured to store into memory data received. Initially, a portion of belt 11 passes through a charging station A. At charging station A, a corona generation device 22 charges the SZ portion of the photoconductive surface of belt 11 to a charge, for example, a relatively high, substantially uniform negative potential. Next, the charged portion of the photoconductive surface is advanced through an exposure station B. At exposure station B, after the exterior surface of photoconductive belt 11 is charged, the charged portion thereof advances to an exposure device 28. The exposure device includes a raster output scanner (ROS), which illuminates the charged portion of the exterior surface of photoconductive belt 11 to record a first electrostatic latent image thereon. Alternatively, a light emitting diode (LED) may be used or any other suitable exposure devices as one of ordinary skill in the art will appreciate. The exposure device 28 selectively illuminates the photoreceptor in areas requiring image development. As a result of light exposure in these areas, the photoreceptor 11 is selectively discharged resulting in an electrostatic latent image corresponding to the desired print image. The photoreceptor 11 then advances the electrostatic latent image to a development station C.

At development station C, a development apparatus indicated generally by the reference numeral 32, transports toner particles to develop the electrostatic latent image recorded on the photoconductive surface. Toner particles are transferred from the development apparatus to the latent image on the belt, forming a toner powder image on the belt, which is advanced to transfer station D. At transfer station D, a sheet of support material or print media 38 is moved into contact with a toner powder image, which is developed on the photoreceptor and contacts a support material or print media 38 with the transfer station D, which may include a dicorotron 48 with a transfer assist blade, a bias transfer roll or other transfer device, for example, that provides for electrostatic and/or mechanical image transfer thereat.

The print media 38 is advanced to transfer station D by a sheet feeding apparatus 40, which could include a feed roll 42 that contacts the uppermost sheet of a stack of sheets 44. Feed roll 42 rotates to advance the uppermost sheet from stack 44 into chute 46. Chute 46 directs the advancing sheet of support material 38 into contact with the photoconductive surface of photoreceptor 11 in a timed sequence so that the toner powder image developed thereon contacts the advancing sheet of support material at transfer station D at a print zone. After transfer, the sheet continues to move in the direction of arrow 50 into a conveyor (not shown), which advances the sheet to fusing station E.

Further along, fusing station E includes a fusing device 52, which permanently affixes the transferred powder image to sheet 38. Sheet 38 passes between a fuser roller 54 and a back-up roller 56 with the toner powder image contacting fuser roller 54, and thus, making the toner powder image permanently affixed to sheet 38. Chute 58 then advances the sheet to catch tray 60. Residual particles are removed from the photoconductive surface at cleaning station F, which can include a brush 62 for example. An erase station 64 is also included for an erase step that may be provided before or after the cleaning station F. The erase station 64 brings the photoreceptor voltage to a uniform low voltage level before the next charging cycle, effectively "erasing" residual negative charge therefrom.

In one embodiment, the platen 15 has a display layer 70 that is transposed along the surface of the platen 15. The display layer 70 provides optical data (e.g., "Align Here," or other optical data) to a user through the transparent platen before, during, or after an item is scanned with the system 10 depending upon the application that is inputted at controls of a user interface 72. The user interface, however, is not limited to any specific process or processing device. FIG. 1 further illustrates a client device, such as a computer device 74 that comprises a memory for storing instructions to be executed via a processor therein. The system 10 includes a network connection 76 for transmitting images scanned to the computer device 74 having an input device 80 and a display 78.

Figure 2:
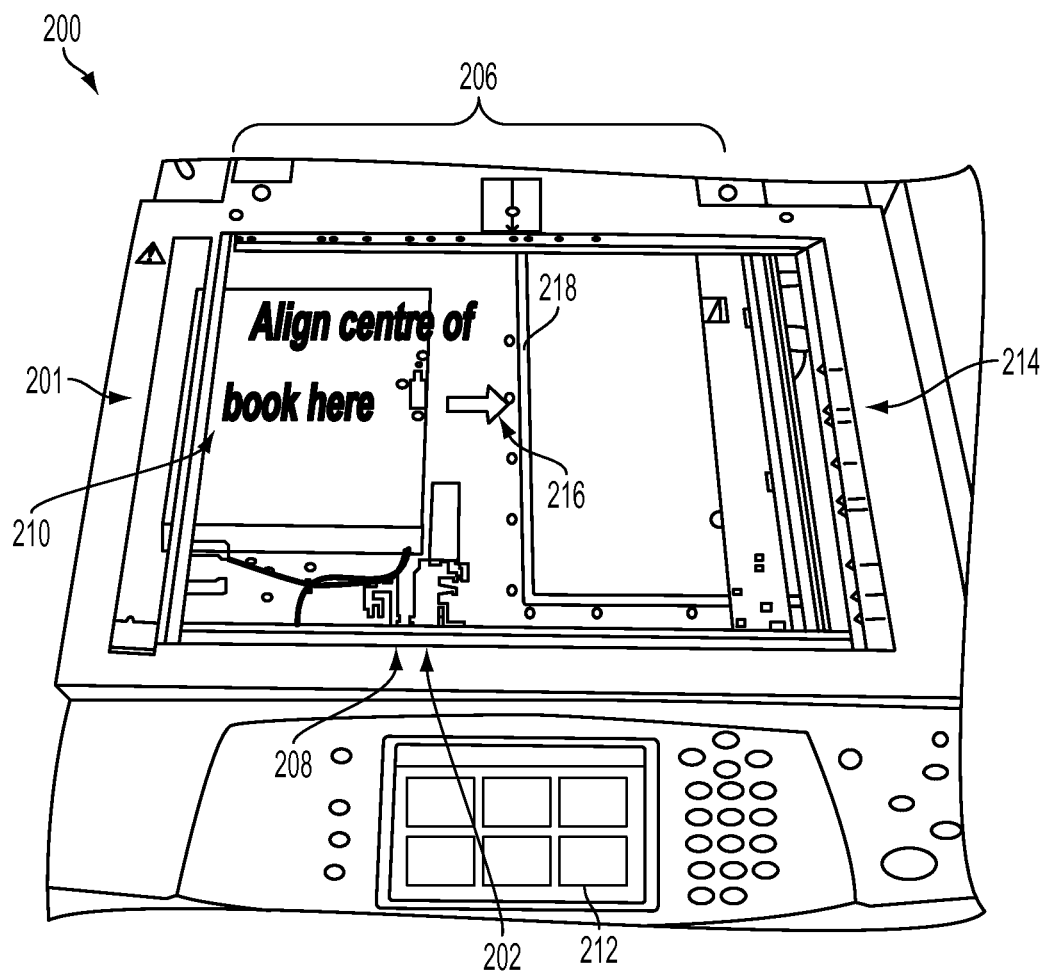
FIG. 2 is a schematic representation of an exemplary aspect of a scanning assembly of a print system.

Referring now to FIG. 2, illustrated is a partial view of an image forming/printing system 200 having a scanner assembly 201. The assembly 201 includes a scanner module 202 that optically scans images, printed text, handwriting, or an object, and converts it to a digital image. The present disclosure is not limited to any particular scanner module and various scanner modules are envisioned herein. The scanner module 202 can include a light device (not shown) underneath a pane or platen 206, under which there is a bright light (e.g., xenon, cold cathode fluorescent or like source), which illuminates the platen 206. The scanner module 202 also includes a moving optical array 208 for use with a sensor, such as a charge-coupled device (CCD) or a Contact Image Sensor (CIS) as the image sensor with various color filters, for example.

Extending along the platen 206 is a displayer layer 210 that includes light emitting devices thereat displaying "Align centre of book here" in the illustration of FIG. 2. The display layer 210 is at least partially translucent in order for light of the scanner module 202 to scan documents, books, or any scanning material placed on the platen 206 without being obstructed. Images to be scanned are placed face down on the transparent platen 206 (e.g., a glass pane), an opaque cover is lowered over it to exclude ambient light, and the scanner module 202 with sensor array and light source move across the platen 206, reading the entire area. An image is therefore visible to detect because of the light reflected, for example. Other means for scanning are also envisioned herein.

In certain embodiments, the display layer 210 includes light emitting devices that operate individually as a light source to generate their own light. For example, the light emitting devices comprise an array of organic light emitting diodes. The display layer 210 laterally extends along at least one side of the transparent platen 206, which includes a top surface and bottom surface. The top surface supports scanning material. The display layer 210 is transposed over the top surface and/or the bottom surface of the transparent platen 206. In one embodiment, the display layer 210 extends over the entire surface of the platen 206 in order to make uniform any translucency introduced in the scanning images of the items scanned. The display layer 210 may alternatively extend over a portion of the platen. For example, when introducing additional or second images, such as a watermark, barcode or graphical symbol into the area being scanned, the display layer 210 could extend over a scanning region of the platen 206.

A user interface 212 is coupled to the display layer 210 in the system 200 for receiving and displaying user instructions. For example, user input is provided in order to copy, scan, print, network scan, and the like for operating the image forming system 200. In some instances, an error message may be generated also at the user interface 212 to indicate that something is wrong or missing for the system 200 to continue operating normally. Oftentimes, the user interface 212 is small in comparison with the rest of the system 200 and therefore the error message may be missed or not noticed until a user discovers that she/he is not able to use associated functions of the system. Rather than, only rely on the user interface 212 to communicate with a user, the display layer 206 provides a display of the same error message over the surface of the transparent platen 206. For example, the display layer 210 includes individual organic light emitting diodes (OLEDs) that are signaled by a controller, such as controller of FIG. 1 in system 10, for example, to provide the message concurrently displayed on the user interface 212 across the transparent platen 206. The display layer 210 thus displays data based on data received at the user interface 212.

In one embodiment, the display layer 212 provides an alignment indication as illustrated in FIG. 2 in order to direct a user of the system to the proper aligning of scanned material. The display layer 210 provides instructional data for aligning items that is supplemental to an alignment grid 214 permanently provided on the edge of the transparent platen 206. Alternatively, the display layer replaces the grid 214. The example of FIG. 2 illustrates optical data provided by the display layer 210 that instructs the user with a message (i.e., "Align centre of book here") and also an arrow 216 pointing to a vertical line 218. Any number of graphical symbols, numbers, alphabetical characters or alphanumerical symbols may be provided by the display layer 210 for providing data to a user. The alignment information displayed is triggered by the user interface controls 212, the lifting of a cover to place scan material upon the platen 206, actually placing scan material on the platen 206 that is sensed by sensors, and/or initiation of a copy/print button for printing/copying, for example. Other controls may also be envisioned as one of ordinary skill in the art can appreciate. In addition, once the optical data is displayed through the platen 206 with the display layer 210, any number of controls may signal the message to distinguish and stop displaying in order to not interfere with the scanning/ copying/printing product. For example, placing an item on the platen, and/or initiating a print button, and any other control as discussed above.

In another embodiment, the display layer 210 is operative to illuminate the array of OLEDs before and/or after a user scans an item. For example, when a user lifts a cover (not shown) of an image forming system to provide a scanned document or other scanning item, the display layer 210 is signaled by a process coupled to the user interface 212. In response, the display layer 210 provides advertising information, which may be pre-programmed in the processor to generate with the display layer 210 over the platen 206 or may be received via a network connection externally for providing an advertising real estate space to commercial vendors. In other certain embodiments, where advertising is not desired, the display layer displays company-wide news bulletins or announcements, daily messages or like communication. Once a document is placed on the transparent platen 206 or a copy control is pressed or initiated, the display layer 206 extinguishes the optical data in order to not interfere with the print process or scan.

Figure 3:
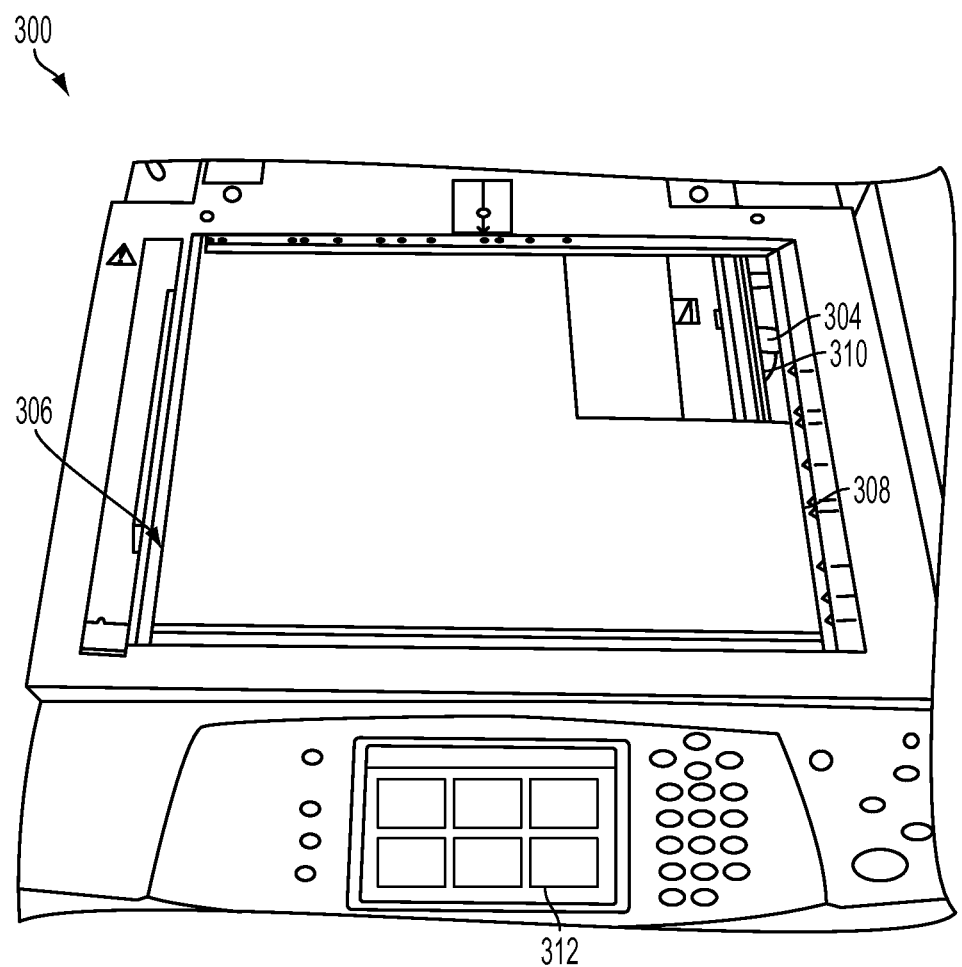
FIG. 3 is a schematic representation of an exemplary aspect of a scanning assembly of a print system.

Referring now to FIG. 3, illustrated is a partial view of an image forming/printing system 300 of an exemplary aspect of the present disclosure. The system 300 has a scanner module (not shown) for scanning items placed on a platen 304, which is entirely or at least partially transparent. A display layer 306 is transposed across at least one surface of the platen. The display layer 306 comprises a layer of OLED devices or other like light emitting devices on a substrate. The display layer 306 is translucent to provide light from the scanning module to emit through the platen 304 for capturing an image to be printed, copied, and/or communicated over a network.

In one embodiment, the display layer 306 colors out a portion 308 of the transparent platen 304 in order to indicate an imaging location 310 where a user should place a scanned item (e.g., a document or paper sheet) for imaging thereat to create a first image, for example. The colored out or blanked out portion 308 is thus provided by a second image created by the display layer 306. For example, a user programs controls at a user interface 312 in order to create the first image of an item or document placed on the platen 304 and based on the document's size or paper tray inputted at the user interface, the display layer 306 indicates the imaging location 310 by creating the shaded portion 308 with a dark color or some other selected color, which in certain embodiments could be selectable in color with different stacked OLEDs of red, green and blue based on a user's preference or other input. The darkened out portion 308 of the platen 304 is not scanned and therefore leaves transparent only the imaging location 310 for scanning. Upon receiving an input at the user display, placing an object on the area to be scanned, or a different input received by the system, the display layer 306 no longer illuminates in order to not interfere with scanning.

In another embodiment, the user interface 312 provides an option to select an area of the platen to be scanned that is independent of the document or item placed onto the platen 304. The area selected for imaging, such as imaging location 310, for example, is selected by user interface controls at the user interface 312. While the imaging location 310 for scanning is illustrated in the right upper hand corner of the platen 304, an offset may be provided in the user interface 312 that enables the imaging location to be anywhere along the platen 304, which can be programmed by providing an offset in two directions. The display layer 306 then provides a darkened portion surrounding the area programmed in order to easily illustrate to the user whether the chosen position and size is adequate. Thus, instant feedback from the light devices within the display layer 306 is provided to the user for reference and eliminates trial and error otherwise. An advantage occurs with the elimination of waste for programming selectable print areas.

Figure 4:
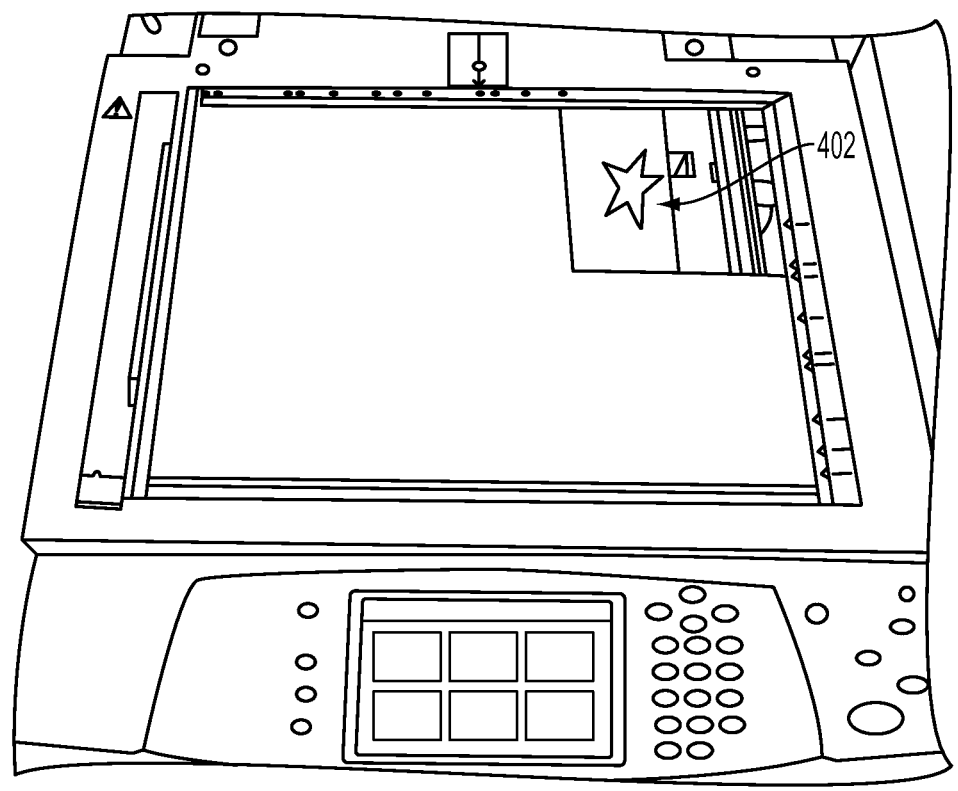
FIG. 4 is a schematic representation of an exemplary aspect of a scanning assembly of a print system.

In another embodiment, the display layer 306 overlays and extends along a flexible surface of the platen, which may be flat or curved, for example. The display layer 306 is at least partially transparent or translucent and includes an array of OLEDs forming an OLED layer, which can be constructed on a transparent backplane (not shown) for driving the different OLEDs according to signals received from a processor or controller. In certain embodiments, a document or item (e.g., object or paper item) is scanned to create a first image for copying, printing, and/or communicating in some manner or form. During the scanning process, the display layer 306 is configured to provide a second image thereon in order to add to the first image being scanned. For example, a watermark, barcode, or other graphical symbol 402 (as illustrated in FIG. 4) may be illuminated by the display layer 306 and added to the first image scanned.

In another embodiment, the display layer may color the entire platen surface being scanned so that a color is provided as background together with any other image being scanned for viewing. For example, text is more easily read by people with dyslexia in a purple or other type background color. Therefore, a purple shade, for example, displayed over at least the scanning area 310 by the display layer 306 would provide a purple colored paper on which the document is printed. This could be useful when colored paper is not available.

In another embodiment, certain items for scanning are made by the displayer layer to be difficult to copy. Upon detecting that an item is copy protected, an image can be spoiled in order to uphold the copy protection as something that should not be copied. For example, an entire layer or line of black ink/toner may be printed on top of a first image scanned when the display layer 306 provides blanked out lines or sections darkened out of text within an image during the scanning process. The blackened out portion 308 is then added to the scanned image by being made a second image during the scanning procedure. The display layer 306 having OLEDs therein is operated to not spoil an entire document as a result of copyright infringement occurring, and may only black out portions, such as lines or figures of a document, as well as sections, which allows the remainder of a document to not be spoiled.

Figure 5:
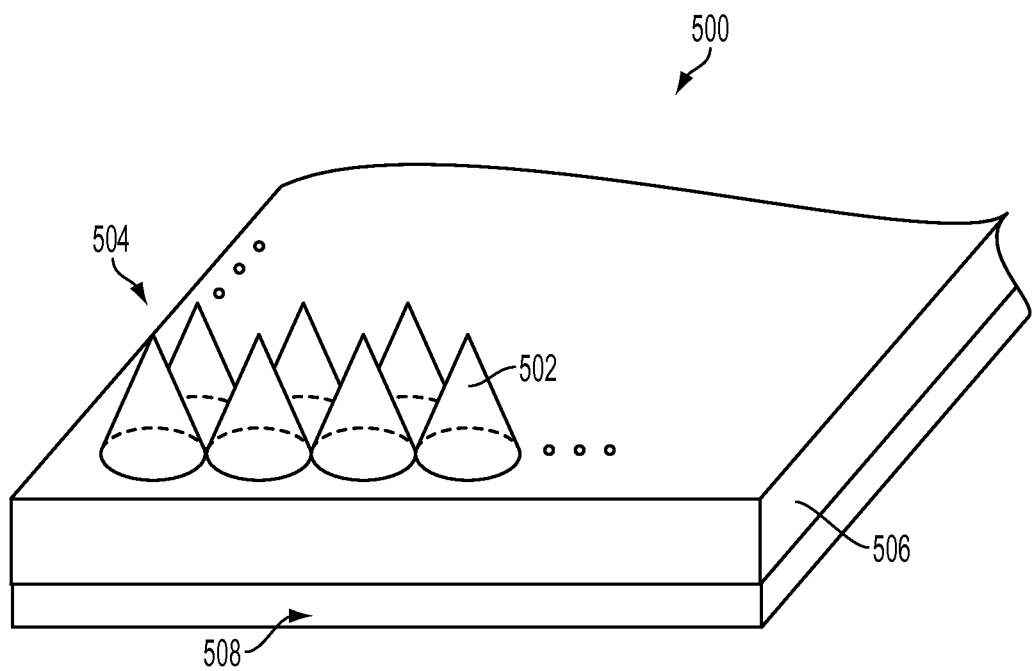
FIG. 5 is a representation of an exemplary aspect of a platen with an array of light emitting devices for a print system.

Referring to FIG. 5, illustrated is a transparent platen having a display layer 500 provided in an image forming/printing system for displaying optical information to a user of the system. The display layer 500 comprises an array of light emitting devices 504. The devices, for example, comprise organic light emitting diodes. The array 504 is defined on a substrate 506 having electrodes for individually energizing the devices. An organic light emitting diode (OLED) is a light-emitting diode (LED) in which the emissive electroluminescent layer is a film of organic compounds which emit light in response to an electric current. This layer of organic semiconductor material is situated between two electrodes in which one or both may be transparent. OLEDs are known and not explained in depth. For further information related to OLEDs and fabrication reference can be made to U.S. Pat. No. 5,907,160 by James M. Wilson, and Jean-Michael Guerin, discussing a thin film organic light emitting diode with edge emitter waveguide, and U.S. Pat. No. 6,392,250 by Hany M. Aziz, Zoran D. Popovic, and Nan-Xing HU, discussing organic light emitting devices with improved performances, which are both incorporated herein by reference in their entirety. The display layer 500 is translucent, and thus, may be partially transparent or completely transparent for allowing light to flow therethrough.

Below the display layer 500 is a platen layer 508 that supports scanning or print material provided thereat for an image to be created. The platen layer is comprised of glass or any other transparent material (e.g., a transparent polymer) that supports items for scanning, copying, and/or printing thereat. The display layer 500 is partially or totally transparent, or translucent to not impede or affect the final output or the image created by the system. Although the display layer 500 is illustrated as transpose upon the platen layer 508, the display layer 500 may reside underneath the platen in order to further protect or encapsulate the array of organic light emitting devices of the display layer 500. The light emitting devices 504 of the display layer are each individually operable to display messaging information, and/or graphical images optically through the platen.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An image forming system, comprising:
   a photoreceptor;
   a charging device that generates electrical charge to the photoreceptor;
   an exposure station that patterns an exposure on the photoreceptor;
   a development station that develops toner onto the photoreceptor;
   a transfer station at a transfer location proximate to the photoreceptor that is configured to transfer toner from the photoreceptor to a continuous print web medium with a transfer current;
   a scanning module for scanning scan items;
   a transparent platen having a top surface and an opposing bottom surface, the top surface supporting the items placed thereon for scanning by the scanning module; and
   a display layer that is at least partially translucent and displays an image to a user through the platen, the display layer extending over at least a portion of at least one of the top surface and the bottom surface of the transparent platen.

2. The system of claim 1, further comprising:
   a user interface display which is coupled to the display layer and receives user input, wherein the user interface and the display layer through the transparent platen display error messages when an error occurs with the image forming system.

3. The system of claim 1, wherein the display layer includes organic light emitting diodes to display optical data to the user.

4. The system of claim 1, further comprising:
   a controller that receives and processes data from a user interface and respectively signals organic light emitting diodes of the display layer to display data based on the data received from the user interface.

5. The system of claim 1, wherein the display layer extends over at least the bottom surface of the transparent platen entirely.

6. The system of claim 1, wherein the display layer overlays at least a scanning region of the transparent platen.

7. The system of claim 6, wherein the display layer displays data through the platen with organic light emitting diodes before a scan item is placed on the platen for scanning and/or after the item is placed on the platen for scanning.

8. An image forming system for printing and scanning, comprising:
- a transparent platen for supporting scanning material placed thereon having a top surface and an opposing bottom surface;
- a scanning module that scans across the transparent platen to capture a scanned image of the scanning material;
- a display layer that extends laterally along at least one of the top surface and the bottom surface of the transparent platen and includes a translucent portion that provides optical information to a user through the transparent platen, the translucent portion covering at least part of the at least one of the top surface and the bottom surface.

9. The system of claim 8, further comprising a transfer station for transferring toner to a print media for printing images.

10. The system of claim 8, wherein the display layer is at least partially translucent and provides messages to the user across the transparent platen when scanning the scanning material is not occurring and enables the scanning module to scan the scanning material across the platen to capture the scanned image without showing the display layer.

11. The system of claim 8, wherein the display layer provides a color across the platen that causes the platen to be translucently colored by providing a colored light.

12. The system of claim 8, further comprising:
- a processing component that provides a signal to the display layer, wherein the display layer displays the information to the user along the platen based on a signal received.

13. The system of claim 12, further comprising:
- a user interface device that receives and displays instructions, wherein the information includes instructions to a location of a document alignment for scanning that is concurrently displayed on the user interface device and on the transparent platen with organic light emitting diodes within the display layer.

14. The system of claim 13, wherein the display layer darkens out a portion of the transparent platen based on a selected area for scanning received at the user interface, wherein only an area surrounding the programmed area is darkened to illustrate to the user the selected area of the translucent platen that is selected for scanning on.

15. The system of claim 8, wherein the display layer darkens a part of the transparent platen upon which the scanning material is not scanning before scanning begins while leaving a remainder portion of the transparent platen upon which the scanning material is scanned at before scanning begins.

16. A scanning assembly of an image forming system, comprising: a transparent platen having a display layer along at least one side of the transparent platen that includes an array of light emitting devices for individually providing a colored light on the transparent platen to display a platen image to a user across the platen, wherein the at least one side of the transparent platen or an opposing side provides support for a scanning material;
- a scanning module that scans across the transparent platen to capture a scanned image on the transparent platen of the scanning material;
- a user interface that receives user input from the user;
- a controller that processes the user input and provides signal to the display layer to activate one or more of the light emitting devices based on at the user input and a position of the scanning material on the platen to display the platen image across the platen.

17. The assembly of claim 16, further comprising:
- a network connection that enables information to be provided to the controller to signal the display layer to display the platen image based on information received from a network.

18. The assembly of claim 16, wherein the scanned image is captured by the scanning module through the transparent platen, and the second image is displayed with one or more of the light emitting devices through the transparent platen before and/or after the scanned image is captured, wherein the light emitting devices comprise organic light emitting diodes.

19. The assembly of claim 16, wherein the platen image includes a graphical symbol displayed on the transparent platen during scanning to be included with the first scanned image.

20. The assembly of claim 16, wherein the platen image includes a shaded color portion for blocking out portions of the transparent platen before scanning or portions of the scanned image during scanning.

\* \* \* \* \*